(12) United States Patent
Kato et al.

(10) Patent No.: US 7,744,004 B2
(45) Date of Patent: Jun. 29, 2010

(54) TAG TAPE, TAG TAPE ROLL, CARTRIDGE, RFID LABEL

(75) Inventors: Takaaki Kato, Nagoya (JP); Takuya Nagai, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 388 days.

(21) Appl. No.: 12/008,792

(22) Filed: Jan. 14, 2008

(65) Prior Publication Data

US 2008/0173720 A1    Jul. 24, 2008

(30) Foreign Application Priority Data

Jan. 15, 2007   (JP)   ............................. 2007-005928

(51) Int. Cl.
*G06K 19/06*   (2006.01)
(52) U.S. Cl. ..................... 235/492; 235/487; 340/572.1
(58) Field of Classification Search .................. 235/487, 235/492, 493; 340/572.1; 156/238
See application file for complete search history.

(56) References Cited

U.S. PATENT DOCUMENTS

| | | | | |
|---|---|---|---|---|
| 6,478,229 | B1* | 11/2002 | Epstein | 235/492 |
| 6,988,666 | B2* | 1/2006 | Appalucci et al. | 235/488 |
| 2007/0222615 | A1* | 9/2007 | Yamaguchi et al. | 340/572.8 |

FOREIGN PATENT DOCUMENTS

JP     2006039854     2/2006

* cited by examiner

*Primary Examiner*—Seung H Lee
(74) *Attorney, Agent, or Firm*—Day Pitney LLP

(57) ABSTRACT

A tag tape and a tag tape roll that can realize a uniform roll winding state, and an RFID label produced using them are provided. A tag tape in which a plurality of RFID circuit elements provided with an IC chip storing information and a loop antenna for transmission/reception of information is continuously arranged in a tape longitudinal direction with a predetermined interval is provided with an extension part of a protection member that compensates a difference of a thickness in a portion of the tag tape where the RFID circuit element is arranged and a thickness in a portion other than that of the tag tape in a tape width direction.

22 Claims, 14 Drawing Sheets

[FIG.1]
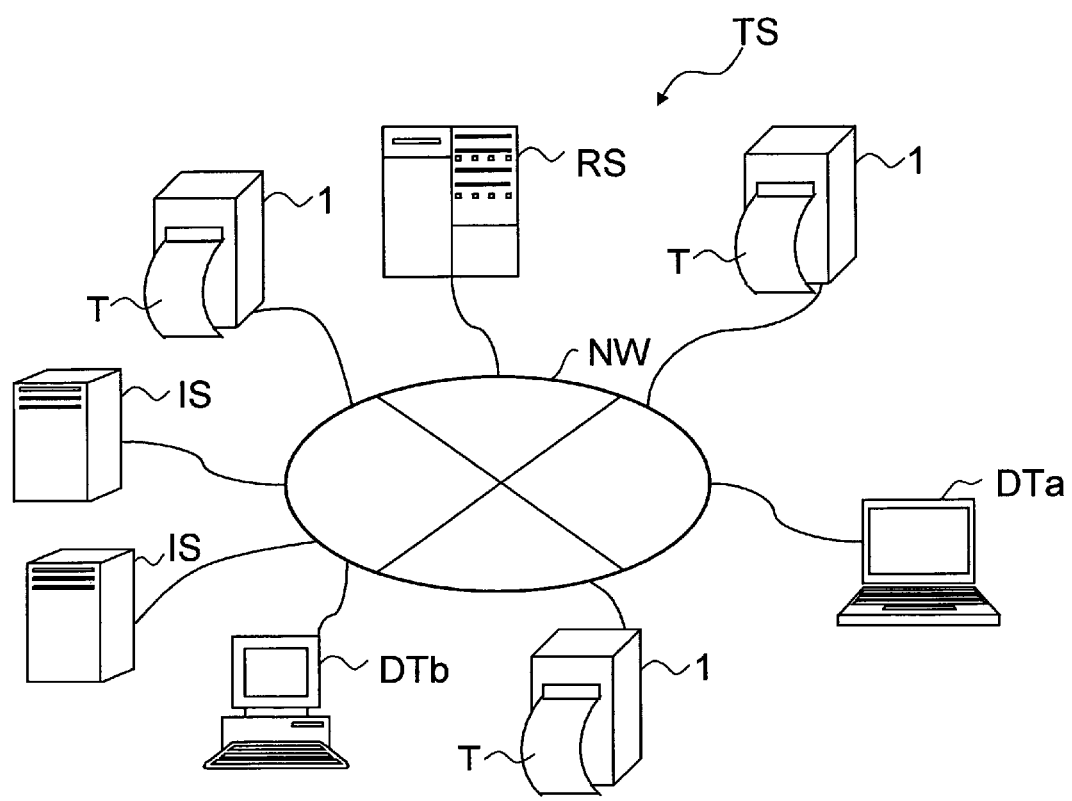

[FIG.2]
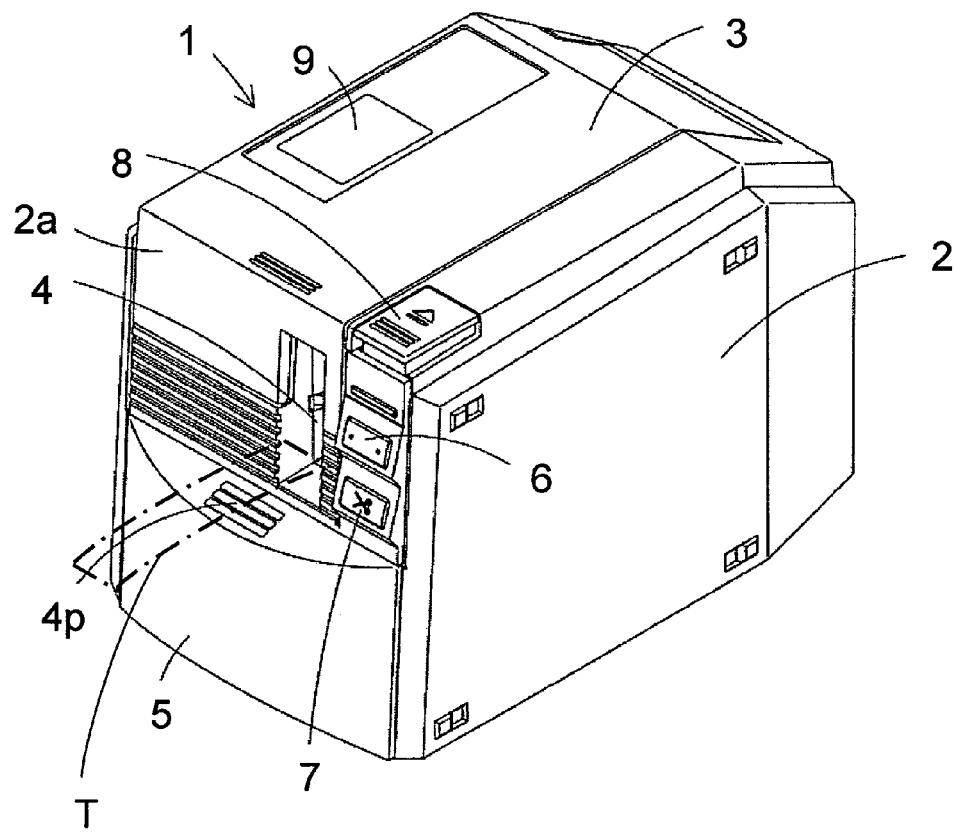

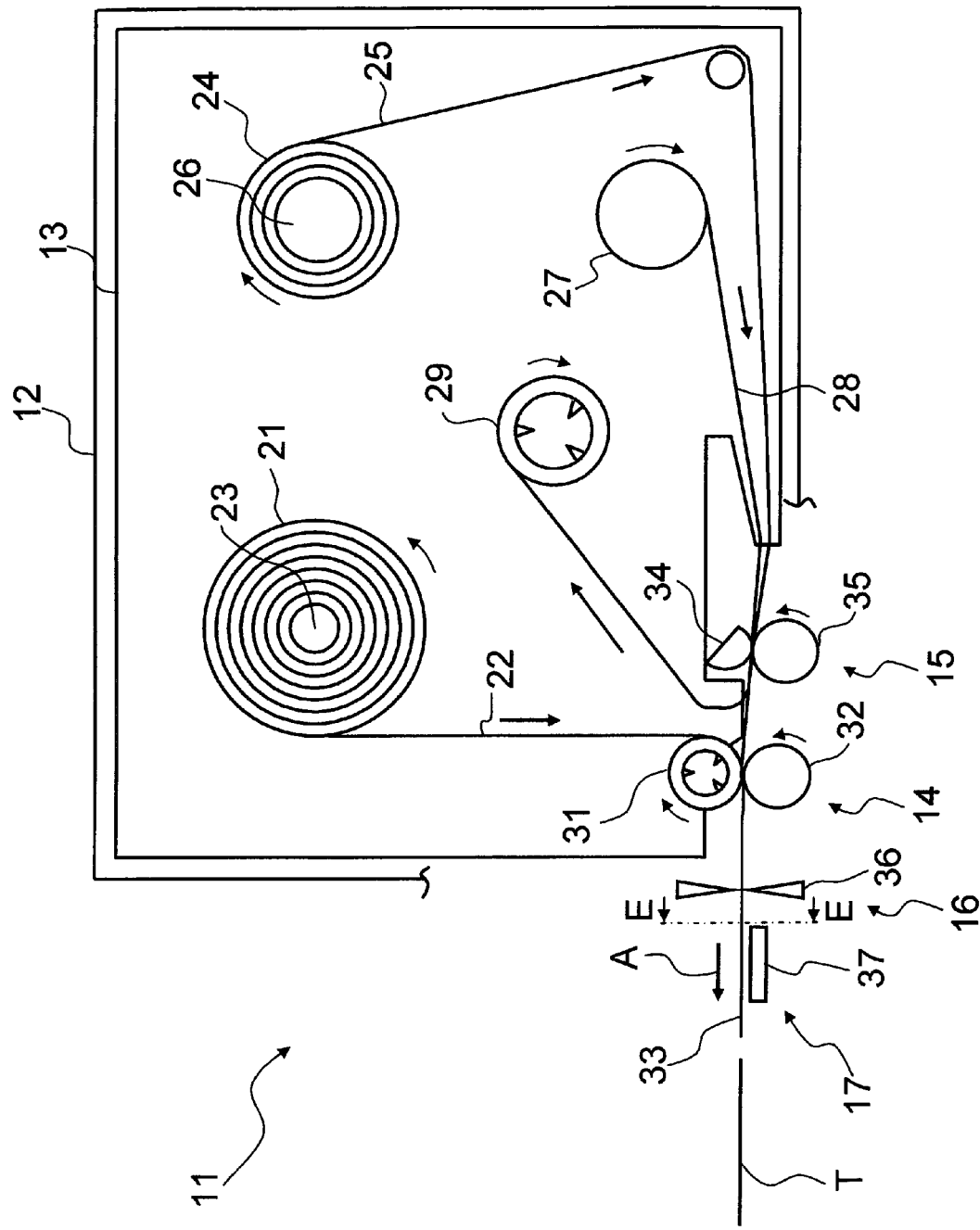

[FIG.4]
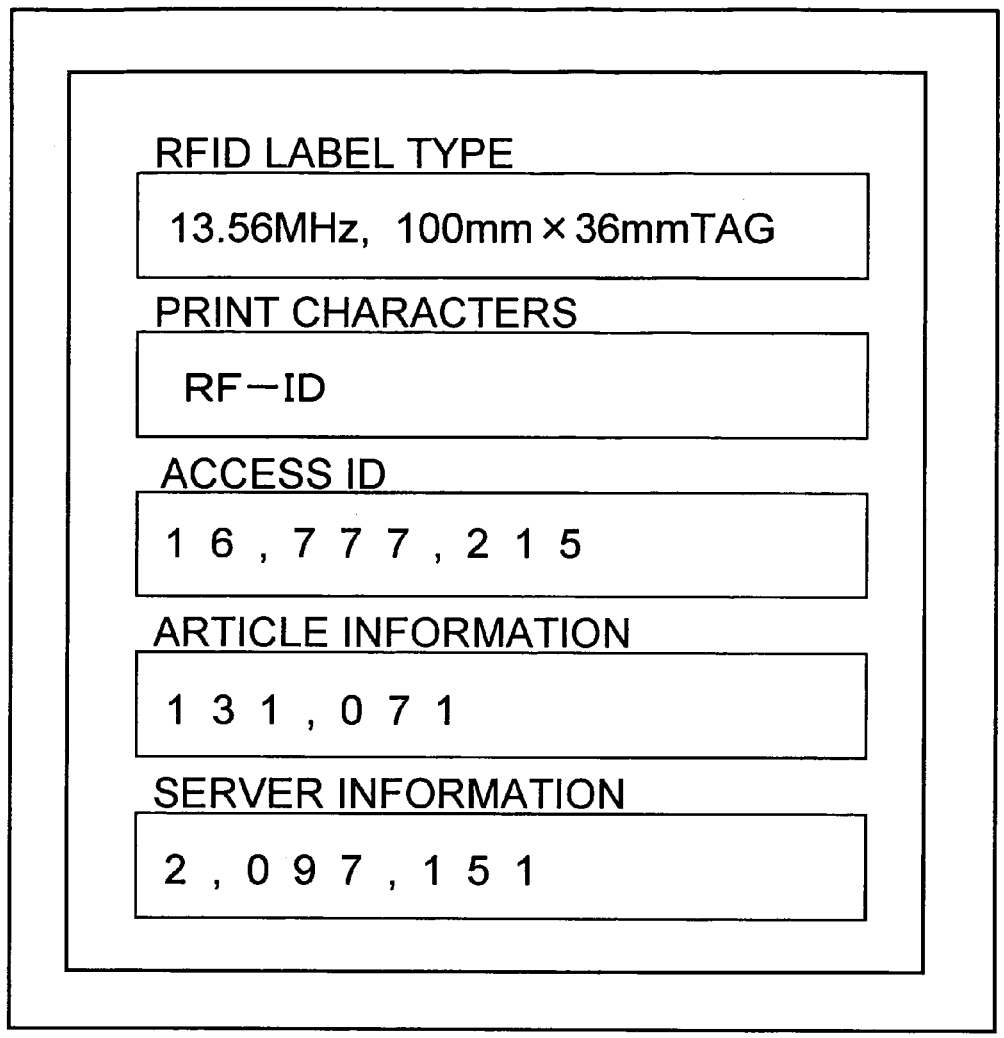

[FIG.5A]
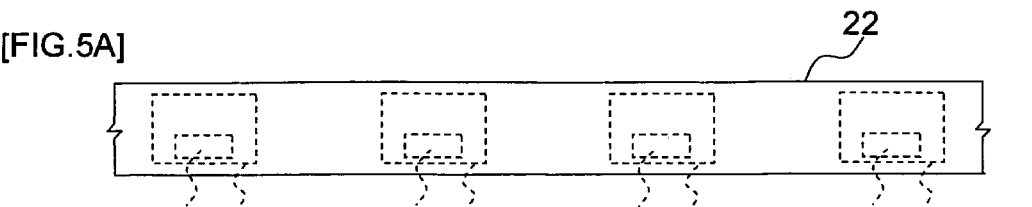
[FIG.5B]
[FIG.5C]
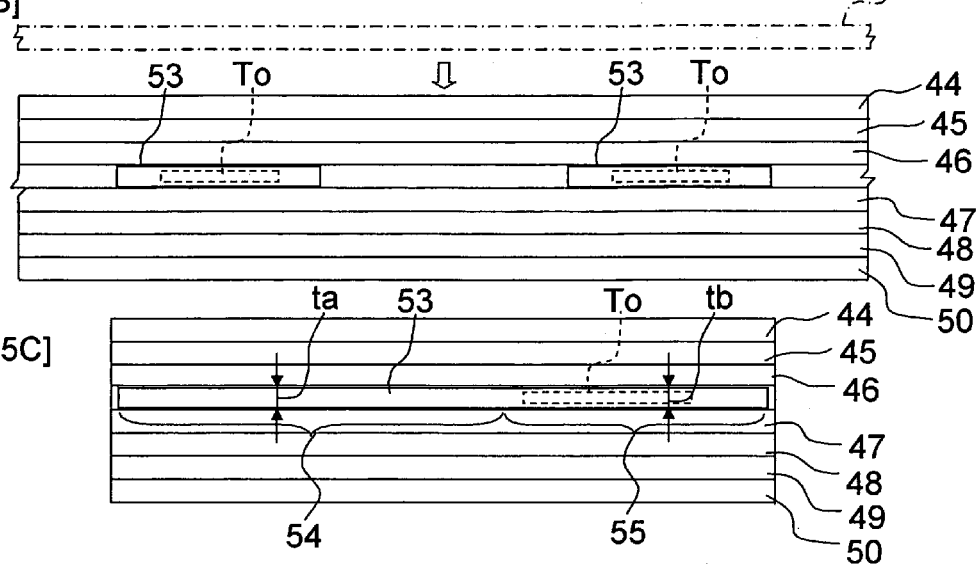
[FIG.5D]
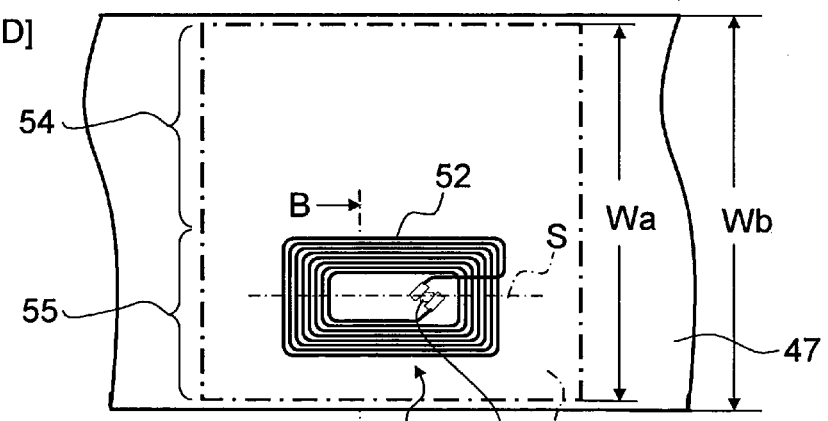
[FIG.5E]
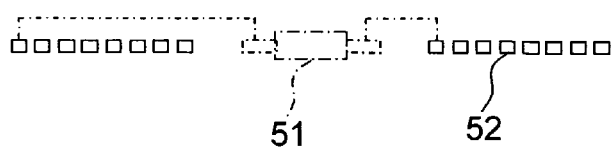

[FIG.6]
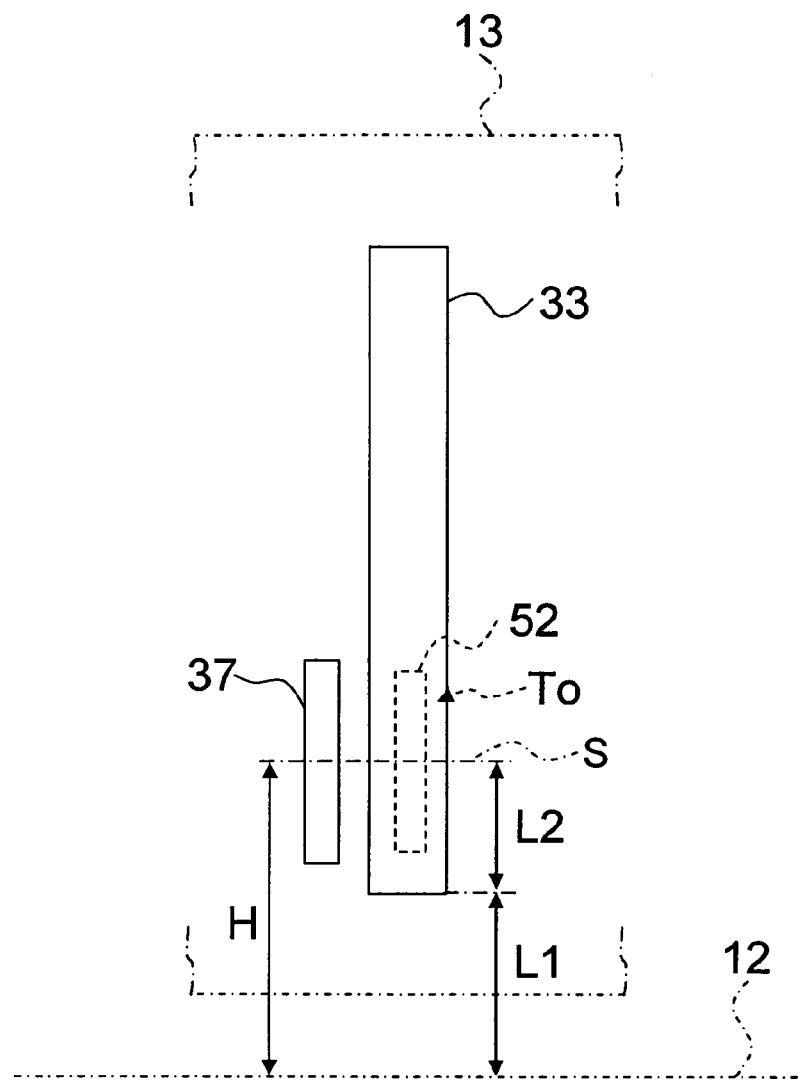

[FIG.7]
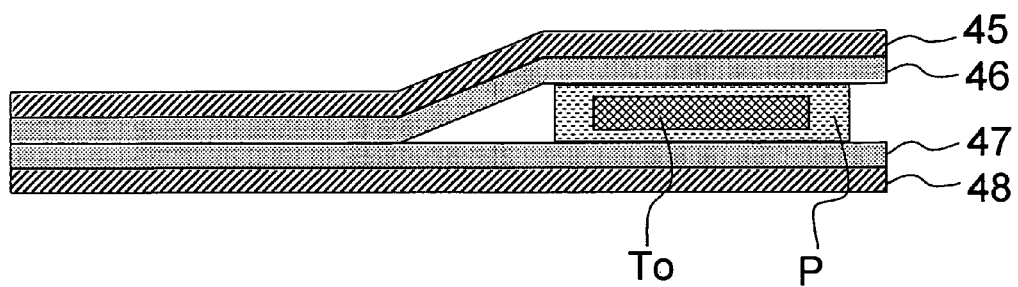

[FIG.8]
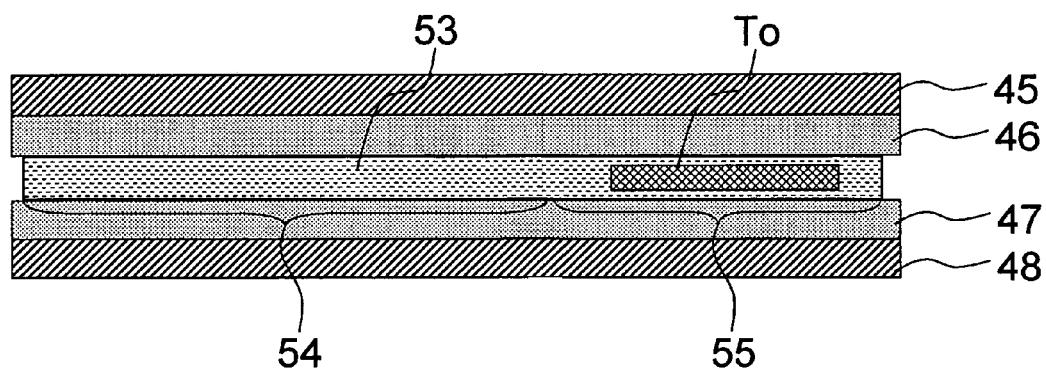

[FIG.9]
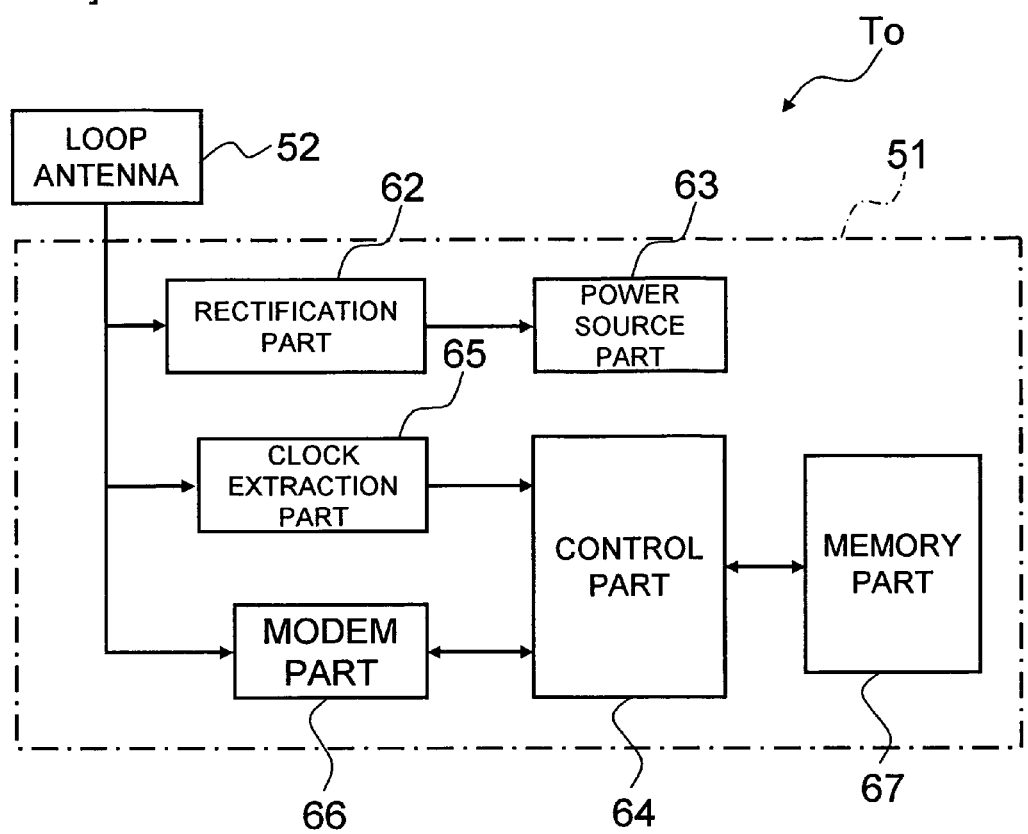

[FIG.10A]
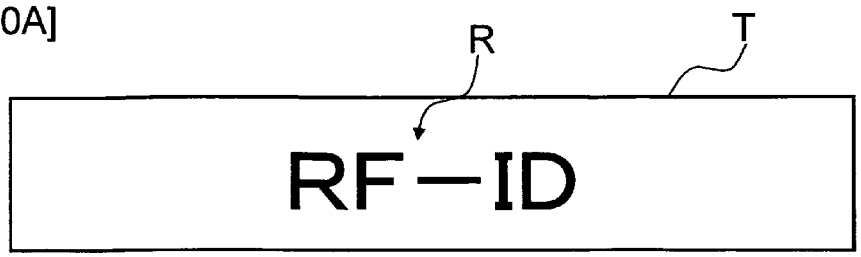
[FIG.10B]
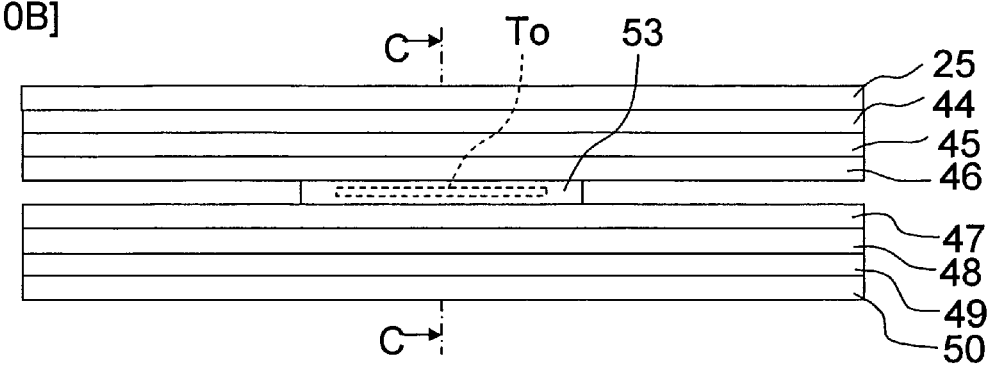
[FIG.10C]
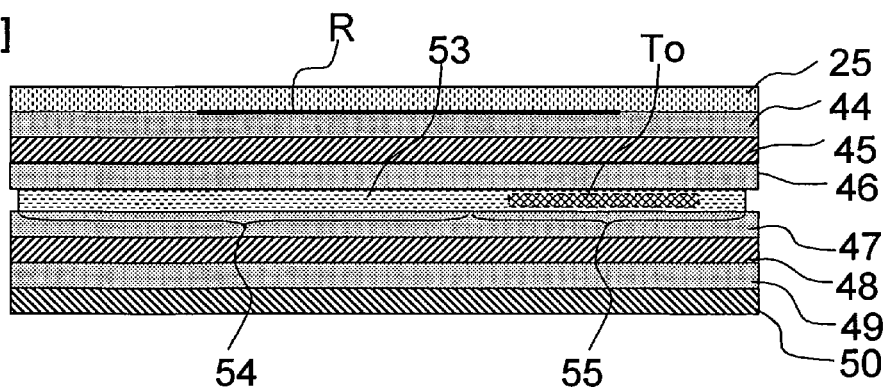

[FIG.11]
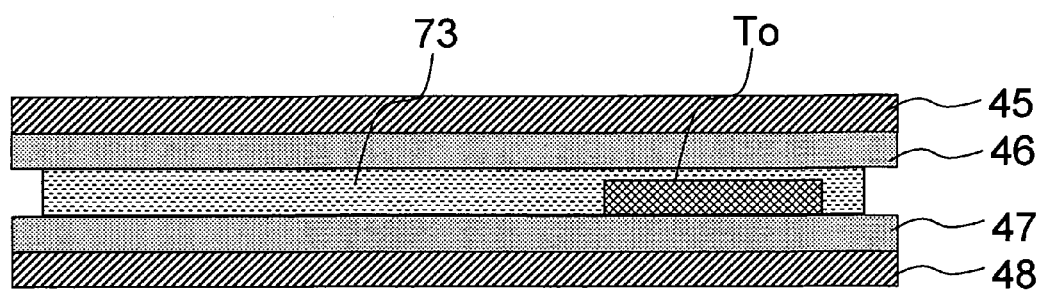

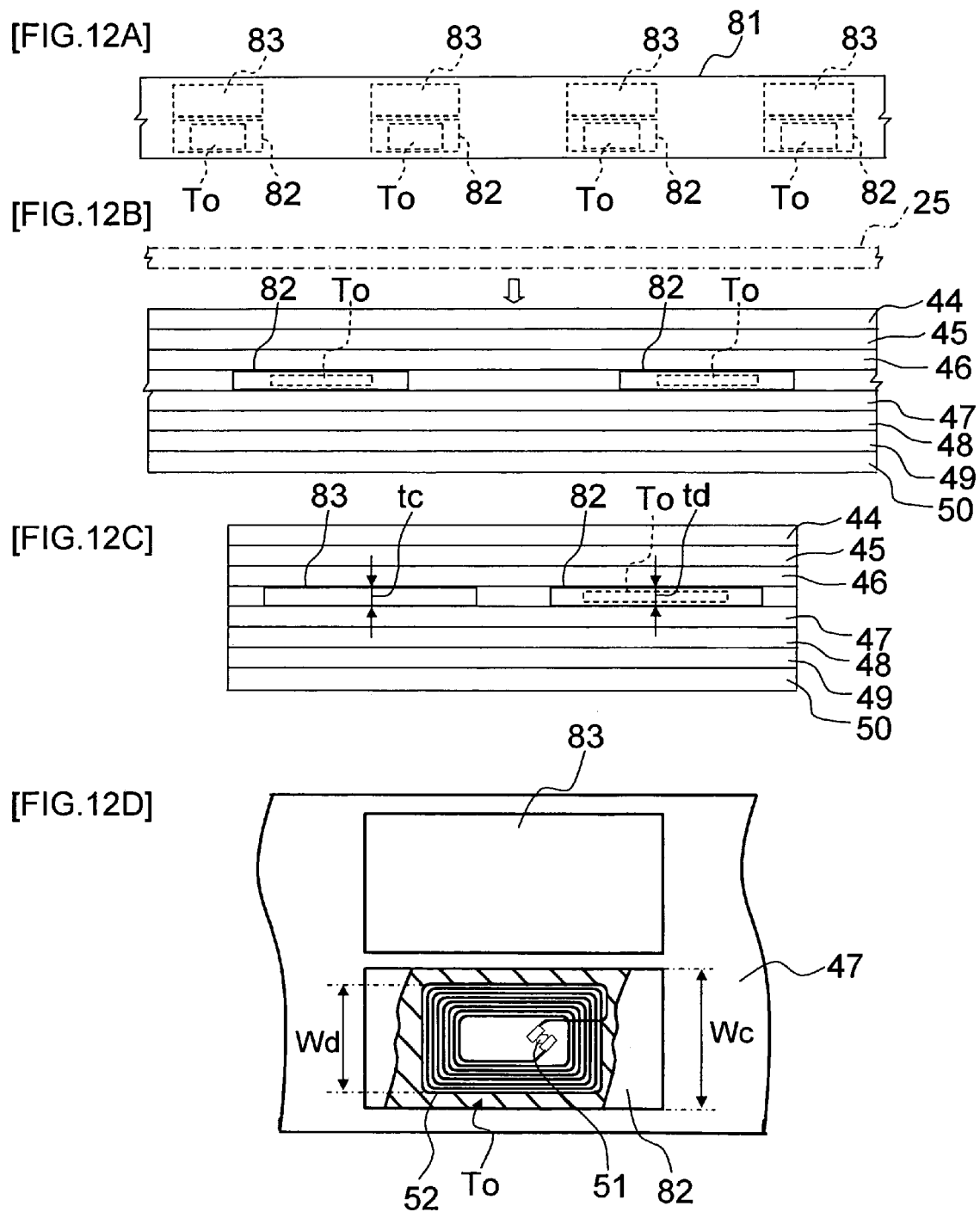

[FIG.13A]
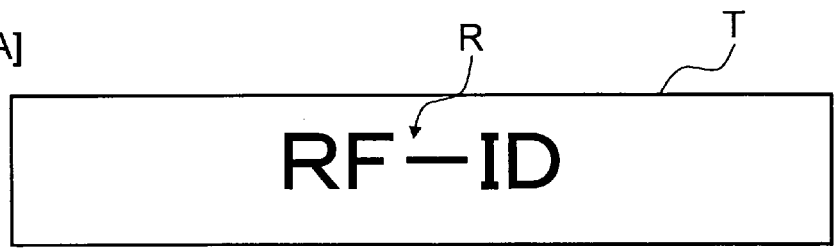
[FIG.13B]
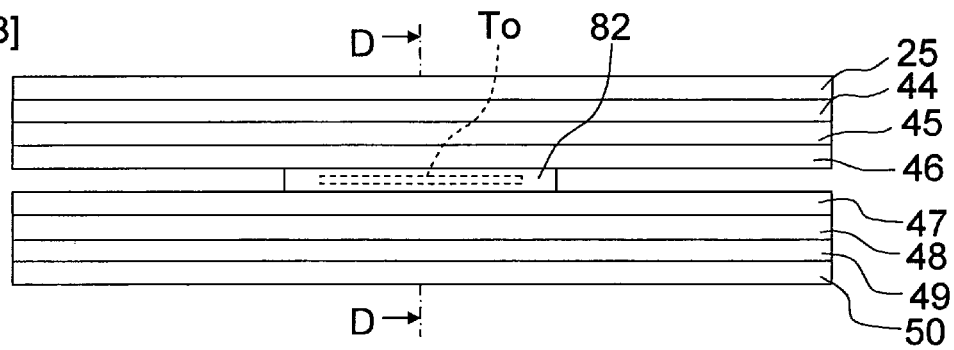
[FIG.13C]
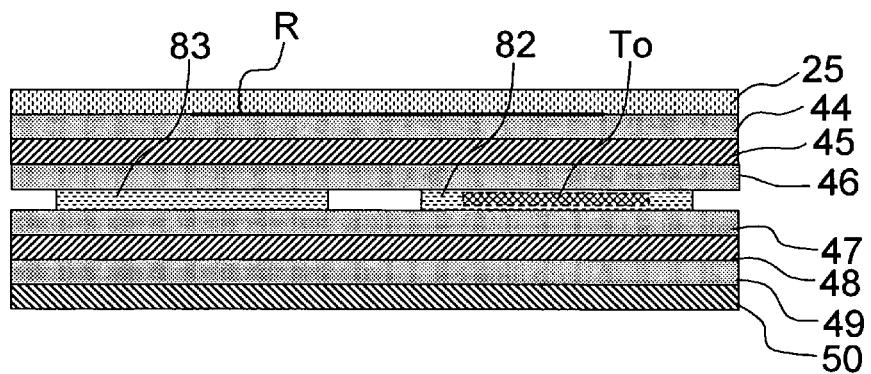

[FIG.14]
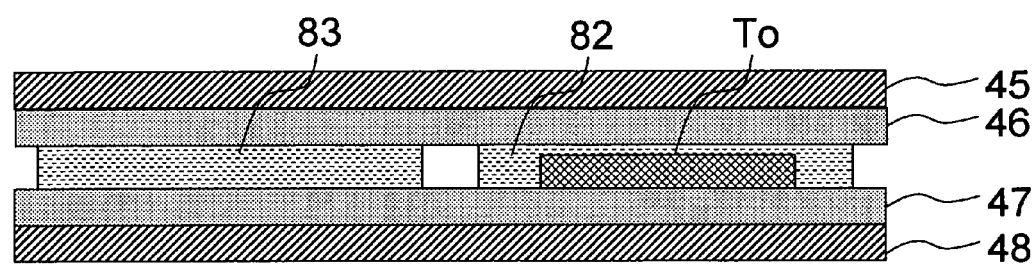

TAG TAPE, TAG TAPE ROLL, CARTRIDGE, RFID LABEL

CROSS-REFERENCE TO RELATED APPLICATIONS

This application claims priority from JP 2007-005928, filed Jan. 15, 2007 the contents of which are hereby incorporated by reference.

BACKGROUND

1. Field

The present disclosure relates to a tag tape having an RFID circuit element storing information, a tag tape roll in which the tag tape is wound in a roll shape, a cartridge in which the tag tape roll is provided, and an RFID label produced using them.

2. Description of the Related Art

RFID (Radio Frequency Identification) systems for transmitting/receiving information contactlessly (an electromagnetic coupling method using a coil, an electromagnetic induction method, an electric wave method or the like) with an RFID circuit element for storing information are known.

A tag label producing apparatus for producing an RFID label by transmitting/receiving information with such RFID circuit element is known. In the tag label producing apparatus, a tag tape on which RFID circuit elements are arranged in the tape longitudinal direction with a substantially equal interval is wound around a supply spool in a roll shape and attached. By supplying the tag tape from the tag tape roll and by bonding it with a print-receiving tape on which a desired print is applied, a tag label tape with print is formed. Then, by writing RFID tag information to the RFID circuit element provided at the tag label tape with print and by cutting the tag label tape with print to a desired length, an RFID label with print is continuously produced.

In the tag tape used for producing the RFID label as above, in order to realize a uniform winding state when the tag tape roll is formed by winding it in a roll state, such an art is known that a thickness (a dimension in the thickness direction) of the tag tape is configured to be substantially uniform along the tape longitudinal direction (See Patent Document 1: JP, A, 2006-39854, for example).

If the thickness of a tag tape is not uniform in general, a difference in the thickness in the tape width direction is increased when the tag tape is wound in the roll state, and there is a fear that the roll might be a flared state and a uniform winding state can not be realized.

In the above prior art, it is possible to make the thickness of the tag tape substantially uniform along the tape longitudinal direction, but the thickness in the tape width direction is not particularly considered.

SUMMARY

The present disclosure has an object to provide a tag tape and a tag tape roll which can realize a uniform roll winding state by making a thickness substantially uniform along the tape width direction, a cartridge in which the tag tape roll is provided, and an RFID label produced using them.

In order to achieve the above object, a tag tape of a first aspect is a tag tape comprising: a plurality of RFID circuit elements continuously arranged in a tape longitudinal direction at a predetermined interval, that respectively includes an IC circuit part for storing information and an antenna for transmitting/receiving information, and a thickness compensating portion that compensates a difference of a thickness in a portion of said tag tape where said RFID circuit element is arranged and a thickness in a portion other than that of said tag tape in a tape width direction.

In the first aspect of the present application, by compensating the difference of thickness in a portion where the RFID circuit element is arranged and thickness in a portion other than that of the tag tape in a tape width direction by the thickness compensating portion, the thickness (the dimension of the tag tape in the thickness direction) can be made substantially uniform along the tape width direction. With the arrangement, when a tag tape roll is made by winding the tag tape around a axis substantially perpendicular to the tape longitudinal direction, biasing of a difference in the dimension in the roll radial direction between an portion where the RFID circuit element is arranged and a portion other than that in the tag tape can be prevented, and a uniform winding state of the tag tape can be realized.

In order to achieve the above object, a tag tape roll of a second aspect is a tag tape roll comprising: a tag tape wound around an axis substantially perpendicular to the tape longitudinal direction, said tag tape including: a plurality of RFID circuit elements continuously arranged in a tape longitudinal direction at a predetermined interval, that respectively includes an IC circuit part for storing information and an antenna for transmitting/receiving information; and a thickness compensating portion that compensates a difference of a thickness in a portion of said tag tape where said RFID circuit element is arranged and a thickness in a portion other than that of said tag tape in a tape width direction.

In the second aspect of the present application, by compensating the difference of thickness in a portion where the RFID circuit element is arranged and thickness in a portion other than that of the tag tape in a tape width direction by the thickness compensating portion, the thickness can be made substantially uniform along the tape width direction. With the arrangement, in the tag tape roll constituted by winding the tag tape around the axis substantially perpendicular to the tape longitudinal direction, biasing of the difference in the dimension in the roll radial direction between an portion where the RFID circuit element is arranged and a portion other than that in the tag tape can be prevented, and a uniform winding state of the tag tape can be realized.

In order to achieve the above object, a cartridge of a third aspect is a cartridge comprising: a tag tape roll provided therein that winds a tag tape around an axis substantially perpendicular to the tape longitudinal direction, said tag tape including: a plurality of RFID circuit elements continuously arranged in a tape longitudinal direction at a predetermined interval, that respectively includes an IC circuit part for storing information and an antenna for transmitting/receiving information; and a thickness compensating portion that compensates a difference of a thickness in a portion of said tag tape where said RFID circuit element is arranged and a thickness in a portion other than that of said tag tape in a tape width direction.

In the third aspect of the present application, with respect to the tag tape roll, by compensating the difference of thickness in a portion where the RFID circuit element is arranged and thickness in a portion other than that of the tag tape in a tape width direction by the thickness compensating portion, the thickness can be made substantially uniform along the tape width direction. With the arrangement, in the tag tape roll arrange in the cartridge, that is constituted by winding the tag tape around the axis substantially perpendicular to the tape longitudinal direction, biasing of the difference in the dimension in the roll radial direction between an portion where the RFID circuit element is arranged and a portion other than that in the tag tape can be prevented, and a uniform winding state of the tag tape can be realized.

In order to achieve the above object, an RFID label of a fourth aspect is an RFID label comprising: a first tag tape base layer in a substantially tape state where a plurality of RFID circuit elements are arranged, said RFID circuit element including an IC circuit part for storing information and an antenna for transmitting/receiving information; a second tag tape base layer provided on a side opposite said first tag tape base layer, that sandwiches said RFID circuit element between them in a tape thickness direction; a mounting adhesive layer that mounts said RFID circuit element to at least one of said first tag tape base layer and said second tag tape base layer; an affixing adhesive layer that affixes said second tag tape base layer to an object to be affixed; and a thickness compensating portion arranged between said first tag tape base layer and said second tag tape base layer, that compensates a difference of a thickness in a portion of said RFID label where said RFID circuit element is arranged and a thickness in a portion other than that of said RFID label in a label width direction.

In the fourth aspect of the present application, since the thickness compensating portion provided between the first tag tape base layer and the second tag tape base layer compensates the difference of thickness in a portion where the RFID circuit element is arranged and thickness in a portion other than that of the label in the label width direction, the thickness of the RFID label can be made substantially uniform along the label width direction. As a result, irregularity on the label surface can be reduced and appearance can be improved.

BRIEF DESCRIPTION OF THE DRAWING

FIG. 1 is a system block diagram illustrating entire system configuration of an RFID label producing system.

FIG. 2 is a perspective view illustrating an appearance configuration of an RFID label producing apparatus.

FIG. 3 is a block diagram of an essential part schematically showing a configuration of the essential part of an internal unit provided inside the apparatus main body.

FIG. 4 is a view showing an example of display on a display screen of a terminal device when an RFID label is produced.

FIGS. 5A to 5E are diagrams showing configuration of a tag tape in a first embodiment of the present disclosure. FIG. 5A shows a configuration of the tag tape longitudinal direction and tape width direction. FIG. 5B shows a configuration of the tag tape thickness direction seen from the side face side. FIG. 5C shows a configuration of the tag tape thickness direction seen from the end face side. FIG. 5D shows a configuration of an RFID circuit element in the tag tape. FIG. 5E shows a sectional structure of the loop antenna along an arrow B-B line in FIG. 5D.

FIG. 6 is a diagram for illustrating a positional relation between an RFID circuit element provided on a bonded tag tape and a loop antenna on the side of the tag label producing apparatus.

FIG. 7 is a sectional view conceptually illustrating a major part of a layer structure in a conventional tag tape.

FIG. 8 is a sectional view conceptually illustrating a major part of a layer structure in the tag tape in the first embodiment of the present disclosure.

FIG. 9 is a functional block diagram illustrating an example of functional configuration of the RFID circuit element.

FIGS. 10A to 10C are plan views illustrating a configuration of an example of the RFID label produced from the tag tape in the first embodiment of the present disclosure. FIG. 10A shows a configuration seen of the RFID label from the front side. FIG. 10B shows a configuration of the label thickness direction of the RFID label seen from the side face side. FIG. 10C shows a sectional structure of the RFID label along an arrow C-C line in FIG. 10B.

FIG. 11 is a sectional view conceptually showing a tape layer structure or label layer structure of an essential part in a variation in which a protection member covers only a face on one side of the RFID circuit element in the first embodiment.

FIGS. 12A to 12D are diagrams illustrating a configuration of a tag tape in a second embodiment of the present disclosure. FIG. 12A shows a configuration of the tag tape. FIG. 12B shows a configuration of the tape thickness direction of the tag tape seen from the side face side. FIG. 12C shows a configuration of the tape thickness direction of the tag tape seen from the end face side. FIG. 12D shows a configuration of the protective member of the RFID circuit element in the tag tape.

FIGS. 13A to 13C are plan views illustrating a configuration of an example of the RFID label produced from the tag tape in the second embodiment of the present disclosure. FIG. 13A shows a configuration of the RFID label seen from the front side. FIG. 13B shows a configuration of the label thickness direction of the RFID label seen from the side face side. FIG. 13C shows a sectional structure of the RFID label along an arrow D-D line in FIG. 13B.

FIG. 14 is a sectional view conceptually illustrating a tape layer structure or label layer structure of an essential part in a variation in which a protection member covers only a face on one side of the RFID circuit element in the second embodiment.

DETAILED DESCRIPTION OF THE PREFERRED EMBODIMENTS

A first embodiment of the present disclosure will be described below referring to the attached drawings. First of all, an overview of an RFID label producing system that produces an RFID label using a tag tape and a tag tape roll according to the present disclosure will be described.

In FIG. 1, an RFID label producing system TS has a tag label producing apparatus 1. The tag label producing apparatus 1 is connected to a route server RS, an information server IS, a terminal DTa, a general-purpose computer DTb and the like via a communication network NW so as to produce an RFID label T on which print based on data arbitrarily input by a user at the terminal DTa, for example, is applied.

In FIG. 2, The RFID label producing apparatus 1 includes an upper lid 3 provided on an upper face of an apparatus main body 2 capable of opening/closing.

The apparatus main body 2 has an internal unit 11 (FIG. 3), which will be described later, provide inside. The apparatus main body 2 also has a front face portion 2a, and at the front face portion 2, a label discharging exit 4, a side lid 5, a power source button 6, and a cutter driving button 7 are provided. The label discharging exit 4 is used for discharging the RFID label T (indicated by a one-dot chain line in the figure) produced inside the apparatus main body 2 to the outside. The side lid 5 is made capable of being opened/closed by rotation with the lower end as a fulcrum and is configured to be rotationally moved forward and opened by pressing down a presser portion 4p provided at the upper end portion from above. The power source button 6 is used for an on/off operation of a power source of the tag label producing apparatus 1.

The cutter driving button 7 is used when a cutting portion 16 (See FIG. 3), which will be described later, is manually operated by a user so as to have a desired length of the RFID label T.

The upper lid 3 is rotatably supported at the end on the right depth side in FIG. 2 of the apparatus main body 2 and urged in the opening direction via an urging member such as a spring (not shown), while the lid is configured capable of being locked between it and the apparatus main body 2. When the opening button 8 arranged adjacently to the upper lid 3 on the top face of the apparatus main body 2 is pushed, the above lock is released and the upper lid 3 is opened by action of the urging member. A see-through window 9 formed by fitting a transparent cover or the like is provided at the upper lid 3.

As shown in FIG. 3, an internal unit 11 is provided with a cartridge holder 12, and a cartridge 13 is attached to the cartridge holder 12 and is provided with a press-feeding portion 14, a printing portion 15, the cutting portion 16, and a transmission/reception portion 17.

The cartridge 13 has a tag tape roll 21 in which a tag tape 22 is wound around a reel portion 23 for tag tape in the roll state, a cover film roll 24 in which a transparent cover film 25 made of PET (polyethylene terephthalate) resin is wound around a reel portion 26 for cover film in the roll state, and an ink ribbon unit configured to take up an ink ribbon 28 fed out from an ink ribbon roll 27 by a ribbon take-up roller 29. This cartridge 13 is attached to the cartridge holder 12 and configured so that a part thereof is seen from the outside through the see-through window 9 in FIG. 1. More specifically, on the surface of the cartridge 13, a tape-type display portion (not shown) that displays a tape type such as a tape width or color of the tag tape 22 is provided, and while the cartridge 13 is attached to the cartridge holder 12, the tape-type display portion can be seen from the outside through the see-through window 9.

The press-feeding portion 14 has a feeding roller 31 and a pressure-contact roller 32 and holds the tag tape 22 fed out from the tag tape roll 21 and the cover film 25 fed out from the cover film roll 24 in an overlapped state between the feeding roller 31 and the pressure-contact roller 32 in the pressure contact manner. The press-feeding portion 14 bonds the cover film 25 onto the tag tape 22 by this pressure-contact holding and feeds out a bonded tag tape 33 formed by bonding between the tag tape 22 and the cover film 25 in an arrow A direction.

The printing portion 15 has a print head 34 and a platen roller 35 and is configured so that the cover film 25 fed out from the cover film roll 24 and the ink ribbon 28 fed out from the ink ribbon roll 27 pass between the print head 34 and the platen roller 35, and a print is applied on the cover film 25 during the passage.

The cutting portion 16 has a cutter 36 and produces an RFID label T by cutting the bonded tag tape 33 to a predetermined length or a desired length by this cutter 36.

The transmission/reception portion 17 has an antenna for transmission/reception such as a loop antenna 37 formed in a coil state, for example, for reading or writing of information by wireless communication with respect to the bonded tag tape 33 through the loop antenna 37, more specifically, information reading or writing to an RFID circuit element To (FIG. 5D), which will be described later, buried and arranged in the bonded tag tape 33.

Production of the RFID label T by the RFID label producing apparatus 1 as above is carried out as follows. When tag label production is started upon input of tag label production at the terminal device DTa in FIG. 1, for example, the feeding roller 31 of the press-feeding portion 14 is driven and the tag tape 22 is fed out from the tag tape roll 21. In synchronization with feeding-out of the tag tape 22, the cover film 25 is fed out from the cover film roll 24.

The cover film 25 fed out from the cover film roll 24 passes through the printing portion 15 before being bonded to the tag tape 22 at the press-feeding portion 14, and at that time, printing is carried out by operation of the print head 34 and the platen roller 35. At this printing processing, the ink ribbon 28 is fed out from the ink ribbon roll 27 in the length according to the number of characters of the print while being taken up by the ribbon take-up roller 29. Such printing processing is carried out based on data input at the terminal device DTa in FIG. 1, for example, and a print character R as in the RFID label T in the example in FIG. 10A, for example, is printed.

The cover film 25 on which the print is applied is pressed into contact with the tag tape 22 by the pressure-contact roller 32 at the press-feeding portion 14, by which it is bonded onto the tag tape 22. The bonded tag tape 33 formed by bonding of the cover film 25 onto the tag tape 22 is fed out by the feeding roller 31 in the arrow A direction and passes through the transmission/reception portion 17.

At the transmission/reception portion 17, the information reading or writing by wireless communication as mentioned above is performed for the bonded tag tape 33 passing therethrough. This wireless communication is carried out based on the data input at the terminal device DTa in FIG. 1, for example, the information read or written at this time is displayed on the terminal device DTa.

When information reading or writing by the transmission/reception portion 17 has finished, the cutter 36 in the tape cutting portion 16 is operated so as to cut the bonded tag tape 33, by which the RFID label T in the predetermined length is produced.

FIG. 4 indicates an example of display on a display screen of the terminal device DTa when the RFID label T is produced. In this example, a type of the RFID label T (access frequency and tag label size), the print character printed by the printing portion 15, an access ID, which is identification information specific to an RFID circuit element in the RFID label, an address of article information stored in the information server IS in FIG. 1, and an address of storage destination of the corresponding information in the route server RS in FIG. 1 are included in the read-out information.

The tag tape 22 and the RFID label T will be described below.

As shown in FIG. 5A, in the tag tape 22, the RFID circuit elements To are arranged as if being buried in a row with a predetermined interval in the longitudinal direction. As shown in FIG. 5D; the RFID circuit elements To are arranged so that a center S of the loop antenna 52 in the tape width direction in each RFID circuit element To is located at a substantially constant position in the tape width direction. More specifically, the RFID circuit elements To are arranged so that the center S of the loop antenna 52 of each RFID circuit element To is located at a position with substantially constant distance from one side edge (lower end portion in this example) of the tag tape 22. This means that the RFID circuit element To is arranged at a constant position in the width direction.

This configuration is employed for more favorable information transmission/reception between the loop antenna 37 and the loop antenna 52 at the wireless communication with the RFID circuit element To through the loop antenna 37 in the above-mentioned RFID libel producing apparatus 1. This will be described using FIG. 6.

In FIG. 6, in order to facilitate understanding of the positional relation, the profile of the cartridge 13 and the position (of the bottom face) of the cartridge holder 12 are shown by a one-dot chain line.

As shown in FIG. 6, the cartridge 13 is attached so that one side edge of the bonded tag tape 33 in the tape width direction (lower end portion in this example) is located at a constant position (distance L1 in this example) with respect to the bottom face of the cartridge holder 12 of the tag label producing apparatus 1. Then, as mentioned above, the information transmission/reception is carried out by wireless communication through the loop antenna 37 provided on the side of the tag label producing apparatus 1 with respect to the RFID circuit element To arranged on the bonded tag tape 33 fed out from the cartridge 13.

At this time, in this embodiment, the RFID circuit elements To are arranged in the bonded tag tape 33 so that the center position S in the tape width direction of the loop antenna 52 in the RFID circuit element To is located at a position with substantially constant distance (distance L2 in this example) from the one side edge in the tape width direction (lower portion in this example). Further, it is configured such that a sum of the distance L1 and the distance L2 is substantially equal to a distance H between the center position S of the loop antenna 37 provided on the side of the tag label apparatus 1 and the bottom face of the cartridge holder 12. With the arrangement, the loop antenna 52 of the RFID circuit element To and the loop antenna 37 on the side of the apparatus can be opposed as shown in FIG. 6. As a result, favorable wireless communication is performed between the loop antenna 37 and the loop antenna 52.

The above is also applied to a case where the cartridge 13 having the tag tape 22 with different tape width is used in the RFID label producing apparatus 1. That is, the RFID circuit elements To are arranged so that even in the tag tape 22 with different tape width, the center position S in the tape width direction of the loop antenna 52 in the RFID circuit element To is located at the position with the distance L2 from the tape lower portion, and even if the width of the tag tape 22 is different, identity in the positional relation between the loop antenna 37 and the loop antenna 52 can be maintained, and favorable transmission/reception can be carried out all the time regardless of the width of the tag tape 22.

As shown in FIG. 5B, the tag tape 22 is in an eight-layered structure having a fourth adhesive layer 44, a second tape base layer 45, a third adhesive layer 46, the RFID circuit element To, a second adhesive layer 47, a first tape base layer 48, first adhesive layer 49, and a separation sheet layer 50 in the order from the front side (upper side in FIG. 5). The fourth adhesive layer 44 is an adhesive layer for bonding cover film and used for bonding the cover film 25 onto the tag tape 22 as mentioned above. The second tape base layer 45 and the first tape base layer 48 are formed in the tape state by a resin material such as a PET resin, for example, and the RFID circuit element To covered by a protection member 53 is arranged between the third adhesive layer 46 and the second adhesive layer 47 provided on the tape base layers 45, 48, respectively. The third adhesive layer 46 and the second adhesive layer 47 function for affixing and securing the RFID circuit element To on the second tape base layer 45 and the first tape base layer 48, respectively. The first adhesive layer 49 is used to affix the RFID label T, which will be described later, to a target article or the like. The separation sheet layer 50 functions to protect the first adhesive layer 49 till it is used for affixation.

As shown in FIG. 5D, the RFID circuit element To has an IC chip 51, which is an IC circuit part, and the coil-state loop antenna 52 connected to the IC chip 51 and is entirely covered by the protection member 53 formed from an appropriate synthetic resin material in the sheet state. The protection member 53 in this embodiment has an extension part 54 widely extending from one side end of the RFID circuit element To in the width direction (corresponding to the width direction of the tag tape 22) so that a width Wa is substantially equal to a width Wb of the tag tape 22. The protection member 53 is also configured to have the same thickness over the entire width direction. That is, the thickness (dimension in the thickness direction) ta of the extension part 54 is substantially equal to a thickness tb of a main part 55 of the protection member 53, which is a portion substantially covering the RFID circuit element To.

The extension part 54 is provided at the protection member 53 as above since the thickness of the tag tape 22 can be made uniform over the entire width in the tape width direction by having the extension part 54 function so as to compensate a difference of a thickness in a portion of the tag tape 22 where the RFID circuit element To is arranged and a thickness in a portion other than that of the tag tape 22. This will be described specifically below.

As shown in FIG. 7, in the conventional tag tape, a protection member P covering the RFID circuit element To has a width only in a portion corresponding to the main part 55 in the above protection member 53. Thus, fluctuation is caused in the tape thickness between the installed portion of the RFID circuit element To covered by the protection member P and the portion other than that in the tag tape width direction. When the tag tape is wound as the tag tape roll 21 in FIG. 3 into the roll state, the fluctuation (irregularity) in the tape thickness in the tape width direction would cause the winding state to be non-uniform.

For the above conventional problem, in the tag tape 22, as the essential part in the layered structure is illustrated in FIG. 8 in the enlarged state, the extension part 54 of the protection member 53 can make the tape thickness uniform over the entire width in the tape width direction. That is, the extension part 54 compensate so as to maintain the tape thickness also in the portion other than the portion where the RFID circuit element To is arranged, and therefore the thickness of the tag tape 22 can be made uniform over the entire width in the tape width direction. By making the thickness of the tag tape 22 uniform, when the tag tape 22 is wound as in the tag tape roll 21 in FIG. 3 into a roll, the winding state can be realized with high uniformity, and feeding-out from the tag tape roll 21 can be further stabilized. Also, by making the thickness of the tag tape 22 uniform, occurrence of uneven rotation of the tag tape roll 21 or wrinkles in the tag tape 22 in FIG. 3 can be effectively prevented, and the roll diameter of the tag tape roll 21 can be made uniform (to avoid eccentric structure), by which an effect is obtained that production management such as handling in assembling the tag tape roll 21 into the cartridge 13 can be facilitated. The function of the extension part 54 can be more effectively exerted by making the thickness ta of the extension part 54 equal to the thickness tb of the main part 55 as mentioned above.

As shown in FIG. 9, the RFID circuit element To includes the IC chip 51 and the loop antenna 52. The IC chip 51 has a rectification part 62 for rectifying a carrier wave of a signal received by the loop antenna 52, a power source part 63 for accumulating energy of the carrier wave rectified by the rectification part 62 so as to make it a driving power supply, a control part 64 for entire control of the IC chip 51, a clock extraction part 65 for extracting a clock signal from the received signal and supplying it to a control unit 64, a modem part 66 for demodulating the received signal and modulating and reflecting the carrier wave of the received signal based on a reply signal from the control part 64, and a memory part 67 for storing data relating to transmission/reception with the RFID label producing apparatus 1.

FIGS. 10A-10C indicates configuration of an example of the RFID label T.

The RFID label T is formed by cutting the bonded tag tape 33 (FIG. 3) obtained by bonding the tag tape 22 in the above eight-layered structure to the cover film 25 to a predetermined length or desired length. Therefore, the RFID label T is in the nine-layered structure in which the cover film 25, the fourth adhesive layer 44, the second tape base layer 45, the third adhesive layer 46, the RFID circuit element To (protection member 53), the second adhesive layer 47, the first tape base layer 48, the first adhesive layer 49, and the separation sheet layer 50 in the order from the front side (upper side in FIG. 10) by addition of the cover film 25 to the eight-layered structure of the tag tape 22, and the print character R is printed from the back face side (lower side in FIG. 10) on the cover film 25.

The RFID label T can make the label thickness uniform over the entire width in the label width direction by means of the extension part 54 in the protection member 53 in the RFID circuit element To, as mentioned above relating to the tag tape 22. As a result, the irregularity on the label surface can be reduced, and appearance of the RFID label T can be improved.

FIG. 11 indicates a tape layer structure (or label payer structure) of an essential part in a variation of the tag tape 22 or the RFID label T in an embodiment as mentioned above. In the above embodiment, the protection member 53 in the RFID circuit element To in the tag tape 22 and the RFID label T covers both front and back faces of the RFID circuit element To, while in this variation, a protection member 73 is in the structure to cover a face only on one side (front in this example) of the RFID circuit element To. In this case, too, the same effect as the above embodiment is obtained.

Next, a second embodiment of the present disclosure will be described below referring to the attached drawings. FIGS. 12A to 12D show a configuration of the tag tape 81 in the second embodiment.

The tag tape 81 in this embodiment is formed basically similarly to the tag tape 22 in the first embodiment so that a width Wc of the protection member 82 is substantially equal to a width Wd of the RFID circuit element To, while it is different in the point that a thickness adjusting member 83 is provided. Specifically, in the tag tape 81, the RFID circuit elements To covered by the protection member 82 are arranged in a row state in the longitudinal direction with a predetermined interval at a constant position in the above width direction, and the thickness adjusting member 83 is arranged at a corresponding position so that it is located in the width direction adjacent to each of the RFID circuit elements To arranged at a constant position in the width direction. In this embodiment using the thickness adjusting member 83, similarly to the description on the first embodiment, the thickness of the tag tape 81 can be made uniform over the entire width of the tape width direction, uniformity of the winding state where the tag tape 81 is wound as in the tag tape roll 21 in FIG. 3 into a roll state can be improved, and feeding-out from the tag tape roll 21 can be further stabilized.

In order to make the thickness of the tag tape 81 uniform with the thickness adjusting member 83, a thickness tc of the thickness adjusting member 83 and a thickness td of the protection member 82 can be made substantially equal so as to effectively exert the thickness compensation function of the thickness adjusting member 83. The thickness adjusting member 83 is preferably formed by the same material as the protection member 82, by which the bending rigidity of the tag tape 81 can be made uniform over the entire width of the tape width direction, and uniformity of the winding state when being rolled can be further improved. The other configuration is basically the same as in the first embodiment, and the common elements are shown by the same reference numerals in FIG. 5 and the description will be omitted.

FIGS. 13A-13C shows a configuration of an example of the RFID label T. The common elements with the RFID label T are given the same reference numerals as in FIG. 10 and the description will be omitted. In this embodiment, too, the similar effect as that in the above-mentioned first embodiment is obtained.

FIG. 14 indicates a sectional view conceptually showing a tape layer structure (or label layer structure) of an essential part of a variation of the tag tape 81 or the RFID label T in the second embodiment as above. In the above embodiment, the protection member 82 of the RFID circuit element To in the tag tape 81 or the RFID label T covers both front and back faces of the RFID circuit element To, but in this variation, the protection member 82 is constructed to cover only a face on one side (front in this case) of the RFID circuit element To. In this case, too, the same effect as that in the above embodiment is obtained.

Several embodiments of the present disclosure have been described, but they are only typical examples and can be put into practice in various forms in a range not departing from its gist. For example, in each of the above embodiments, print is applied to the cover film and the cover film is bonded to the tag tape, but not limited to that, the tag tape itself may be provided with the cover film in advance. In this case, the print is applied directly onto the cover film of the tag tape. Also, in each of the above embodiments, the third adhesive layer 46 and the second adhesive layer 47, which are mounting adhesive layers, are provided on the second tape base layer 45 and the first tape base layer 48, respectively, but not limited to that, the mounting adhesive layer may be provided only any one of the second tape base layer 45 and the first tape base layer 48.

In the above, a case where the bonded tag tape 33 for which the printing and access (reading or writing) to the RFID circuit element To for reading have been finished is cut by the cutter 36 so as to produce the tag label T has been described, but not limited to that. That is, when a label mount separated in advance to a predetermined size corresponding to the label (so-called die-cut label) is continuously arranged on the tape fed out from the roll, there is no need to cut by the cutter 36 but after the tag tape is discharged from the discharging exit 4, only the label mount (provided with the RFID circuit element To for reading after access and corresponding print) is peeled off the tape so as to produce the RFID label T, and the present disclosure may also be applied to this type.

In the above, the print is applied onto the cover film 25 different from the tag tape 22 provided with the RFID circuit element To and they are bonded together, but not limited to that, the present disclosure may be applied to a method that the print is applied to the print-receiving tape layer provided at the tag tape 22 (of a type that bonding is not carried out). Moreover, not limited to the type that information transmission/reception is carried out with respect to the RFID circuit element To, while printing is made in order to identify the RFID circuit element To by the print head 34. The printing does not necessarily have to be made but the present disclosure may be applied to those for reading or writing of RFID tag information.

Moreover, a case where the tag tape is wound around the reel member to constitute a roll and the roll is arranged in the cartridge 13, from which the tag tape is fed out, has been described above as an example, but not limited to that. A lengthy flat sheet or strip state tape or sheet (including those formed by cutting it to an appropriate length after the tape wound around a roll is fed out) is stacked in a predetermined storage portion to be made into a cartridge (flatly laminated in a storage in the tray shape, for example), and the cartridge may be attached to a cartridge holder on the side of tag label producing apparatus to be transferred/fed from the storage portion for print and writing so as to form the tag labels.

Moreover, it may be so configured that the roll is directly attached detachably on the side of the tag label producing apparatus, or the lengthy flat sheet or strip state tape or sheet is transferred from outside the tag label producing apparatus one by one and supplied into the tag label producing apparatus by a predetermined feeder mechanism. Furthermore, it is not even limited to those attached detachably on the side of the tag label producing apparatus as the cartridge 13 but the tag tape roll may be provided as a so-called installed type or integral type attached not detachably on the side of the apparatus main body.

Other than those mentioned above, methods of the above embodiments and their variations may be combined as appropriate for use.

Though not specifically exemplified, the present disclosure should be put into practice with various changes made in a range not departing from its gist.

What is claimed is:

1. A tag tape comprising:
a plurality of RFID circuit elements continuously arranged in a tape longitudinal direction at a predetermined interval, that respectively includes an IC circuit part for storing information and an antenna for transmitting/receiving information, and
a thickness compensating portion that compensates a difference of a thickness in a portion of said tag tape where said RFID circuit element is arranged and a thickness in a portion other than that of said tag tape in a tape width direction.

2. The tag tape according to claim 1, wherein:
said thickness compensating portion is arranged so that a center of said antenna in the tape width direction is located at a position with a substantially constant distance from one side edge of said tag tape in the tape width direction.

3. The tag tape according to claim 2, further comprising a substantially sheet-state protection member provided that covers at least one side of said RFID circuit element in the tape thickness direction; wherein
said thickness compensating portion is an extension part extended from said protection member in the tape width direction.

4. The tag tape according to claim 3, wherein:
said protection member comprises main part other than said extension part,
a thickness of said extension part is substantially equal to a thickness of said main part.

5. The tag tape according to claim 2, wherein:
said thickness compensating portion is a thickness adjusting member provided adjacent to said RFID circuit element in the tape width direction.

6. The tag tape according to claim 5, further comprising a substantially sheet-state protection member provided that covers at least one side of said RFID circuit element in the tape thickness direction; wherein
a thickness of said thickness adjusting member is substantially equal to a thickness of said protection member.

7. The tag tape according to claim 6, wherein:
said thickness adjusting member is constituted by substantially the same material as said protection member.

8. The tag tape according to claim 1, further comprising a substantially tape-state tag tape base layer where said plurality of RFID circuit elements are continuously arranged in the tape longitudinal direction with a predetermined interval; wherein
a bonding adhesive layer that bonds said tag tape base layer and a print-receiving tape to be printed together.

9. A tag tape roll comprising:
a tag tape wound around an axis substantially perpendicular to the tape longitudinal direction,
said tag tape including:
a plurality of RFID circuit elements continuously arranged in a tape longitudinal direction at a predetermined interval, that respectively includes an IC circuit part for storing information and an antenna for transmitting/receiving information; and
a thickness compensating portion that compensates a difference of a thickness in a portion of said tag tape where said RFID circuit element is arranged and a thickness in a portion other than that of said tag tape in a tape width direction.

10. The tag tape roll according to claim 9, wherein:
said thickness compensating portion is arranged so that a center of said antenna in the tape width direction is located at a position with a substantially constant distance from one side edge of said tag tape in the tape width direction.

11. The tag tape roll according to claim 10, wherein:
said tag tape further includes a substantially sheet-state protection member provided that covers at least one side of said RFID circuit element in the tape thickness direction,
said thickness compensating portion is an extension part extended from said protection member in the tape width direction.

12. The tag tape roll according to claim 11, wherein:
said protection member comprises main part other than said extension part,
a thickness of said extension part is substantially equal to a thickness of said main part.

13. The tag tape roll according to claim 10, wherein:
said thickness compensating portion is a thickness adjusting member provided adjacent to said RFID circuit element in the tape width direction.

14. The tag tape roll according to claim 13, wherein:
said tag tape further includes a substantially sheet-state protection member provided that covers at least one side of said RFID circuit element in the tape thickness direction,
a thickness of said thickness adjusting member is substantially equal to a thickness of said protection member.

15. The tag tape roll according to claim 14, wherein:
said thickness adjusting member is constituted by substantially the same material as said protection member.

16. The tag tape roll according to claim 9, wherein:
said tag tape further includes:
a substantially tape-state tag tape base layer where said plurality of RFID circuit elements are continuously arranged in the tape longitudinal direction with a predetermined interval, and
a bonding adhesive layer that bonds said tag tape base layer and a print-receiving tape to be printed together.

17. A cartridge comprising:

a tag tape roll provided therein that winds a tag tape around an axis substantially perpendicular to the tape longitudinal direction, said tag tape including:

a plurality of RFID circuit elements continuously arranged in a tape longitudinal direction at a predetermined interval, that respectively includes an IC circuit part for storing information and an antenna for transmitting/receiving information; and a thickness compensating portion that compensates a difference of a thickness in a portion of said tag tape where said RFID circuit element is arranged and a thickness in a portion other than that of said tag tape in a tape width direction.

18. The cartridge according to claim 17, further comprising a print-receiving tape roll that winds a print-receiving tape to be bonded with said tag tape.

19. The cartridge according to claim 17 or 18, further comprising an ink ribbon roll that winds an ink ribbon for printing a print on said tag tape or said print-receiving tape.

20. The RFID label according to claim 19, further comprising:

a print-receiving tape layer to be printed; and a bonding adhesive layer that bonds said print-receiving tape layer to said first tag tape base layer.

21. The cartridge according to claim 18, wherein:

a bonded tag tape is produced by bonding said tag tape and said print-receiving tape, and said cartridge is attached so that one side edge of said bonded tag tape in the tape width direction is located at a constant position with respect to a bottom face of a cartridge holder of a tag label producing apparatus.

22. An RFID label comprising:

a first tag tape base layer in a substantially tape state where a plurality of RFID circuit elements are arranged, said RFID circuit element including an IC circuit part for storing information and an antenna for transmitting/receiving information;

a second tag tape base layer provided on a side opposite said first tag tape base layer, that sandwiches said RFID circuit element between them in a tape thickness direction;

a mounting adhesive layer that mounts said RFID circuit element to at least one of said first tag tape base layer and said second tag tape base layer;

an affixing adhesive layer that affixes said second tag tape base layer to an object to be affixed; and a thickness compensating portion arranged between said first tag tape base layer and said second tag tape base layer, that compensates a difference of a thickness in a portion of said RFID label where said RFID circuit element is arranged and a thickness in a portion other than that of said RFID label in a label width direction.

* * * * *